(12) United States Patent
Sudhakar et al.

(10) Patent No.: US 6,430,508 B1
(45) Date of Patent: Aug. 6, 2002

(54) TRANSFER FUNCTION METHOD OF SEISMIC SIGNAL PROCESSING AND EXPLORATION

(75) Inventors: Vasudhaven Sudhakar; Emil Blias, both of Calgary (CA)

(73) Assignee: Core Laboratories, Inc., Houston, TX (US)

( * ) Notice: Subject to any disclaimer, the term of this patent is extended or adjusted under 35 U.S.C. 154(b) by 69 days.

(21) Appl. No.: 09/693,610

(22) Filed: Oct. 20, 2000

Related U.S. Application Data
(60) Provisional application No. 60/160,676, filed on Oct. 21, 1999.

(51) Int. Cl.[7] ................................................. G01V 1/48
(52) U.S. Cl. ............................................. 702/6; 702/17
(58) Field of Search .............................. 702/14, 17, 18, 702/6, 11, 12, 13; 367/56, 57

(56) References Cited

U.S. PATENT DOCUMENTS

| | | | |
|---|---|---|---|
| 4,794,573 A | 12/1988 | Bell et al. | 702/16 |
| 4,922,362 A | 5/1990 | Miller et al. | 702/16 |
| 6,131,694 A | * 10/2000 | Robbins et al. | 367/57 |

* cited by examiner

Primary Examiner—Donald E. McElheny, Jr.
(74) Attorney, Agent, or Firm—Madan, Mossman & Sriram, P.C.

(57) ABSTRACT

The present invention provides a method of obtaining and processing seismic data to obtain enhanced geophysical maps from pre-existing 3D seismic data. A first set of data is obtained from a vertical seismic profile (VSP) survey and a second set from reverse seismic profile survey by reversing the locations of the sources and receivers of the VSP survey. The two sets of data are combined to determine a transfer function or model, which is then applied to a set of 3D seismic data to obtain a seismic map of the area surveyed for the 3D data.

19 Claims, 11 Drawing Sheets

① <u>Time Gate</u>

↓ Fourier Transform

② <u>Frequency Domain</u>

↓ Natural Logarithm (complex)

③ <u>Log Frequency Spectrum</u>

↓ Inverse Fourier Transform

<u>Quefrency Domain</u>
(Complex Cepstrum)

⑥ <u>Time Function</u>

↑ Inverse Fourier Transform

⑤ <u>Frequency Domain</u>

↑ Natural Anti-Logarithm (complex)

④ <u>Log Frequency Spectrum</u>

↑ Fourier Transform (a real view of phone layout)

TRANSFER FUNCTION METHOD OF SEISMIC SIGNAL PROCESSING AND EXPLORATION

CROSS REFERENCES TO RELATED APPLICATIONS

This application claims priority from U.S. Provisional Application Serial No. 60/160,676 filed Oct. 21, 1999.

BACKGROUND OF THE INVENTION

1. Field of the Invention

This invention relates generally to seismic surveying and processing of seismic data, and more particularly to combining vertical seismic profiling and reverse seismic data to obtain enhanced seismographs of the earth's subsurface formations from prior 3D data.

2. Description of the Related Art

The seismic data gathering method referred to as "vertical seismic profile" ("VSP") surveys are methods that involve placing seismic wave detectors or receivers at various depths in a well and a seismic source (an acoustic source) at or near the surface. The seismic source is activated or set off at such surface or near surface locations and the signals detected by the sensors are recorded and processed for obtaining subsurface maps for seismographs, which are depth charts of certain geological characteristics of the subsurface formation. In the reverse vertical seismic profile or "RVSP," surveys are methods where data are gathered with receivers placed at spaced-apart locations at the surface in response to an acoustic source activated in a wellbore. Data from VSP and RVSP surveys are processed to obtain and/or enhance seismographs.

Both VSP and RSVP methods have been known in the art. The present invention, however, provides a method wherein the VSP and RVSP surveys are performed by reversing the placements of the seismic sources and receivers and then combining the two (2) sets of data to obtain certain transfer functions, which are then utilized to obtain enhanced seismographs from 3D data.

SUMMARY OF THE INVENTION

The present invention provides a method of obtaining and processing seismic data to obtain enhanced geophysical maps from 3D seismic data. A first set of data is obtained from a vertical seismic profile (VSP) survey and a second set from reverse seismic profile survey by reversing the locations of the sources and receivers of the VSP survey. The two sets of data are combined to determine a transfer function or model, which is then applied to a set of 3D seismic data to obtain a seismic map of the area surveyed for the 3D data.

Examples of the more important features of the invention thus have been summarized rather broadly in order that the detailed description thereof that follows may be better understood, and in order that the contributions to the art may be appreciated. There are, of course, additional features of the invention that will be described hereinafter and which will form the subject of the claims appended thereto.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals and wherein.

DETAILED DESCRIPTION OF THE PREFERRED EMBODIMENT

In the present method, two (2) sets of data are gathered: one set with vertical seismic profile survey and the second with reverse vertical seismic profile survey, or one set of data representing the upgoing wavefield and another set of data representing the downgoing wavefield. The two (2) sets of data are then combined to obtain a transfer function, which is utilized to obtain enhanced seismographs of the earth's subsurface from 3D data.

Figure 1:
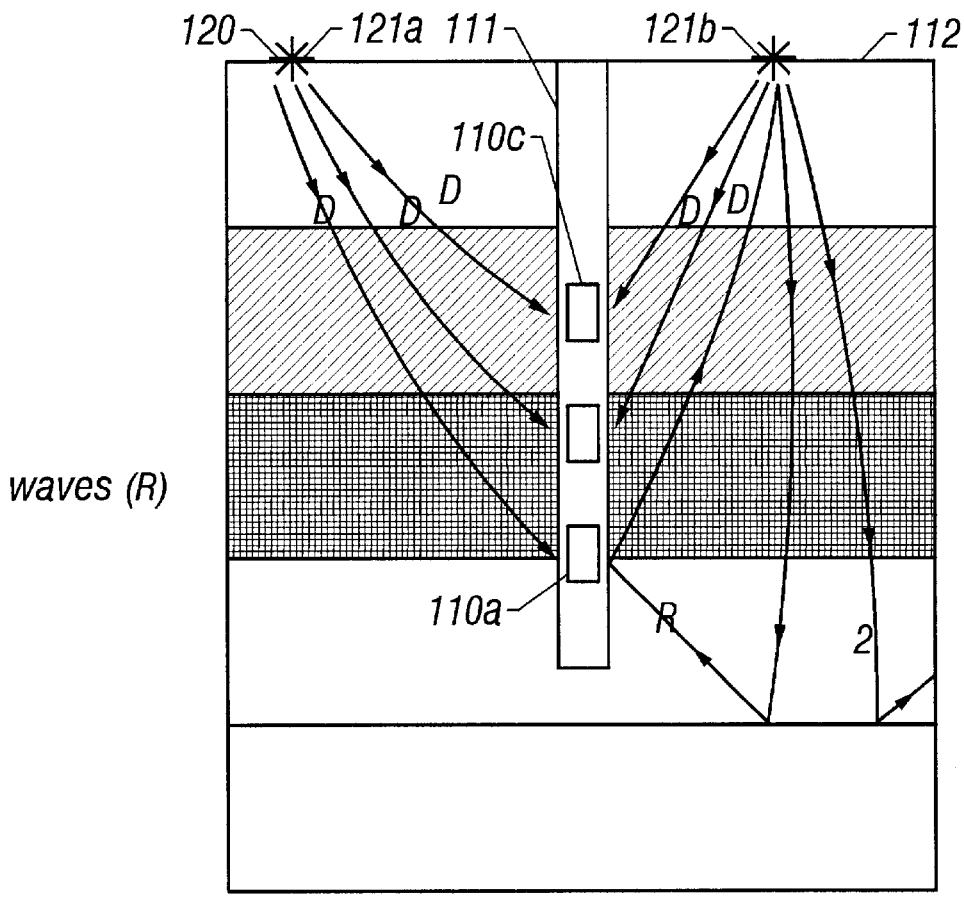
FIG. 1 is a schematic diagram of a vertical seismic profile survey method according to one embodiment of the present invention.

FIG. 1 shows a type of commonly used vertical seismic profile survey method. A plurality of seismic wave detectors 110a–110c (geophones, three component phones, or hydrophones) are placed in a wellbore 111 formed from a surface location 112. A seismic or acoustic source 120 is activated or set off at a plurality of spaced-apart locations at the surface 112, such as locations 121a and 121b. The receivers 110a–110c detect the sound waves reaching the receivers, in response to the seismic waves generated by the sources 120. The receivers 110a–110c provide signals representative of the detected waves, which signals are processed as more fully described below.

Still referring to FIG. 1, the downgoing acoustic waves are marked "D" while the downgoing waves which arrive at the detectors after having been reflected from bed boundaries are marked "R." The raypath for a given velocity medium may be expressed as:

$$V = V_0 + a\, z,$$

where V is the acoustic velocity of the formation, $V_0$ is the initial acoustic velocity, z is the depth, and a is the acceleration.

Figure 1A:
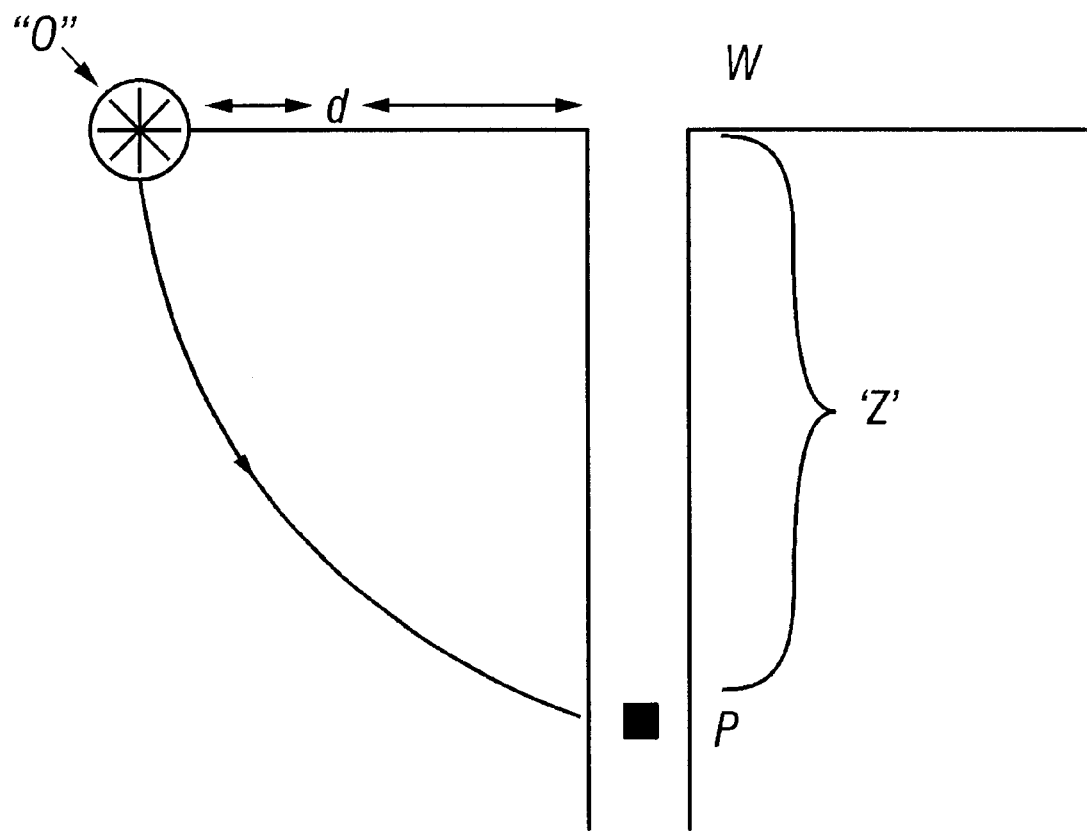
FIG. 1A shows the distance/depth relationship of a source and receiver.

Travel time "t" is given by:

$$t=(1/a)\cos h^{-1}\{1+a^2(d^2+z^2)/2V_0(V_0+az)\}$$

where "d" is the distance of well head from source "o" and "z" is the depth of sensor P from the surface as shown in FIG. 1A.

Figure 2:
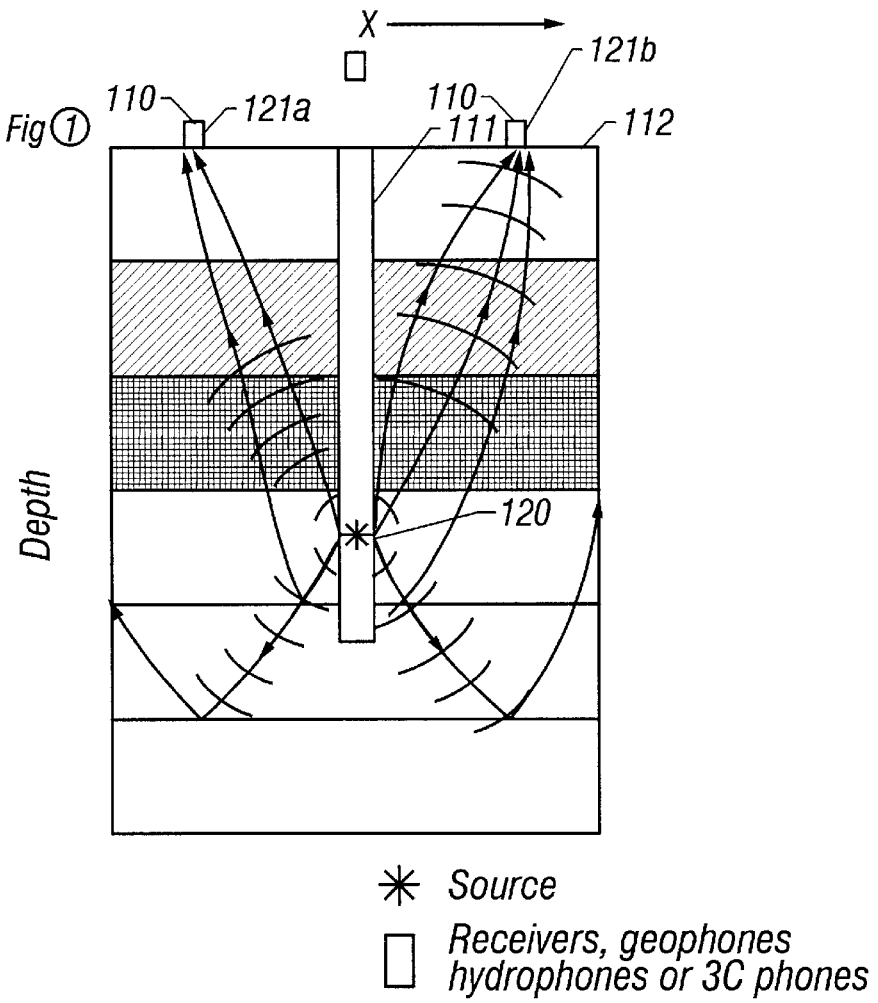
FIG. 2 is a schematic diagram of a reverse vertical seismic profile survey geometry wherein the locations of the acoustic sources and receivers are reverse from the locations of FIG. 1.

FIG. 2 shows a reverse vertical seismic profiling survey according to the method of the present invention. In the present method, to perform an RVSP survey, the source 120 (which is preferably the same type of source as utilized in the VSP survey of FIG. 1) is placed at the locations previously occupied by the receivers 110a–110c and the receivers (denoted as 110) are placed at the locations previously occupied by the source 120 shown in FIG. 1. As in FIG. 1, the direct arrivals are marked "D" while the reflected arrivals are marked "R". It should be noted that the direct arrivals "D" as well as the reflected arrivals "R" have the exact raypaths for the upgoing as well as the downgoing waves, because the two (2) sets of data are obtained by reversing the locations of the same receivers and sources. In the present method, the direct downgoing waves of FIG. 1, and the direct upgoing waves of FIG. 2 (both shown as "D" in their respective figures) are combined. These waves have identical travel paths but are opposite in at least the following characteristics:

(a) the amplitude of the waveform, when arranged along common geological boundaries are different;

(b) the frequency and phase characteristics at the boundaries are different;

(c) the noise content, which is usually random, is different; and (d) the rate of loss of frequency is different when identical raypaths are compared along common geological boundaries.

For noisy waves, multiple traces for the same raypath are stacked to obtain desired signal to noise ratio.

Figure 3:
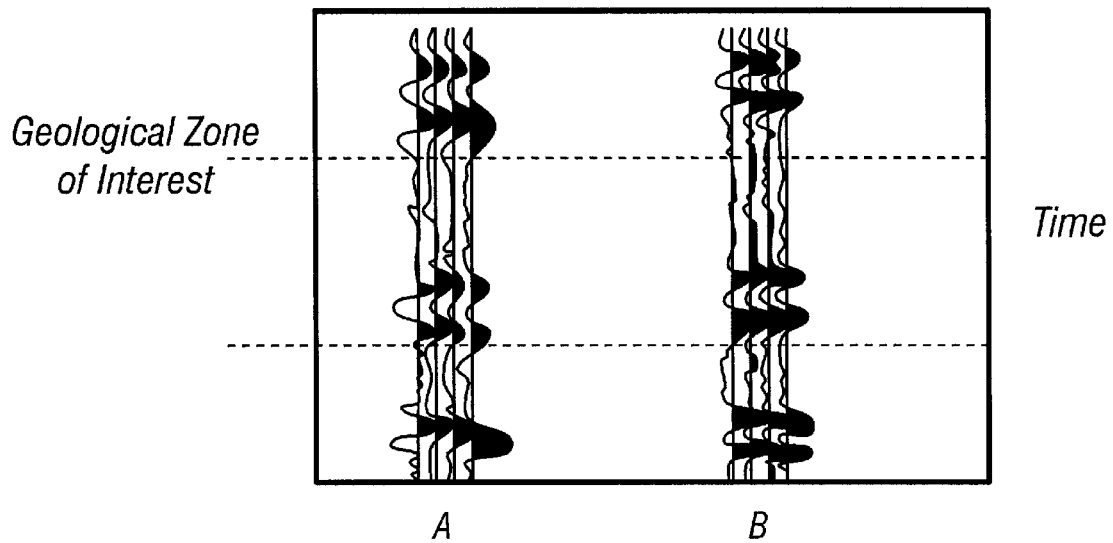
FIG. 3 shows representative downgoing and upgoing waves arranged along increasing time for a particular offset.

FIG. 3 shows hypothetical downgoing and upgoing waves arranged along increasing time for a particular offset from the VSP and RVSP surveys performed as described above in reference to FIG. 1 and FIG. 2. Wavelets "A" represent the downgoing waves arranged along increasing time while wavelets "B" represent upgoing waves arranged along increasing time for a particular offset. Same arrangements can be made with common direct arrivals "D" and the reflected arrivals "R."

For the purpose of obtaining the two sets of data described above, different survey geometries may be employed. Some of these survey geometries are described below with reference to FIGS. 4–9.

Figure 4:
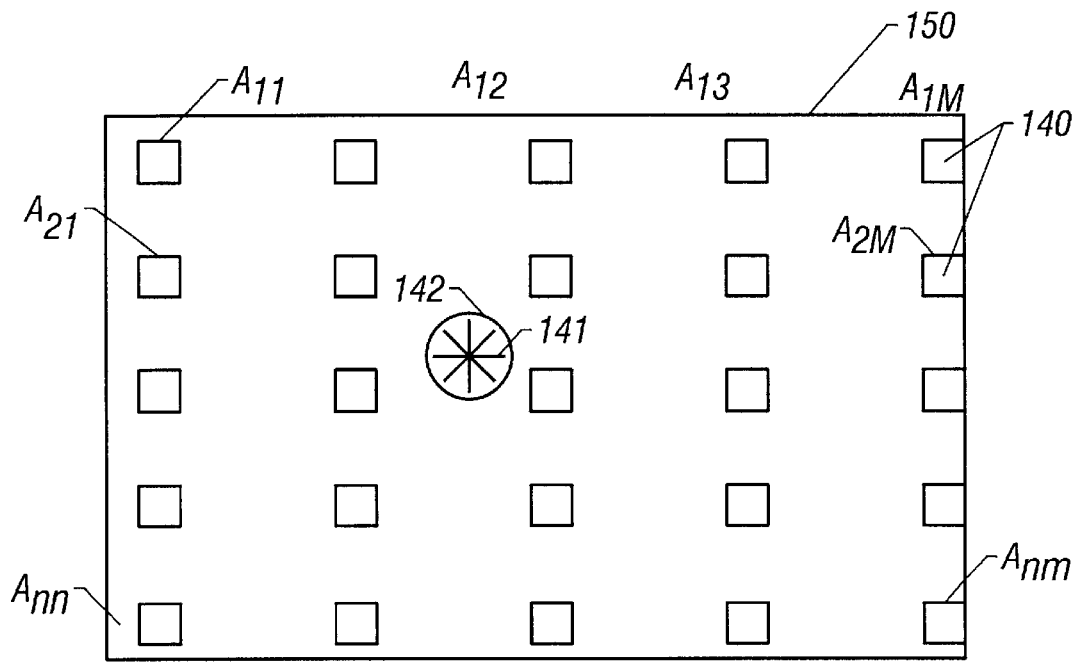
FIG. 4 shows an aerial view of an RSVP survey.

FIG. 4 shows an areal view of the layout of the surface receivers according to one geometry for RVSP survey wherein the receivers 140 are arranged at the nodes $A_{11}$–$A_{nm}$ of a grid 150 with n rows and m columns. The grid 150 is arranged around the wellbore 141. The seismic source 142 is activated at known depths inside the well 141 to record data by the receivers 140 at the nodes $A_{11}$–$A_{nm}$ of the grid 150.

Figure 5:
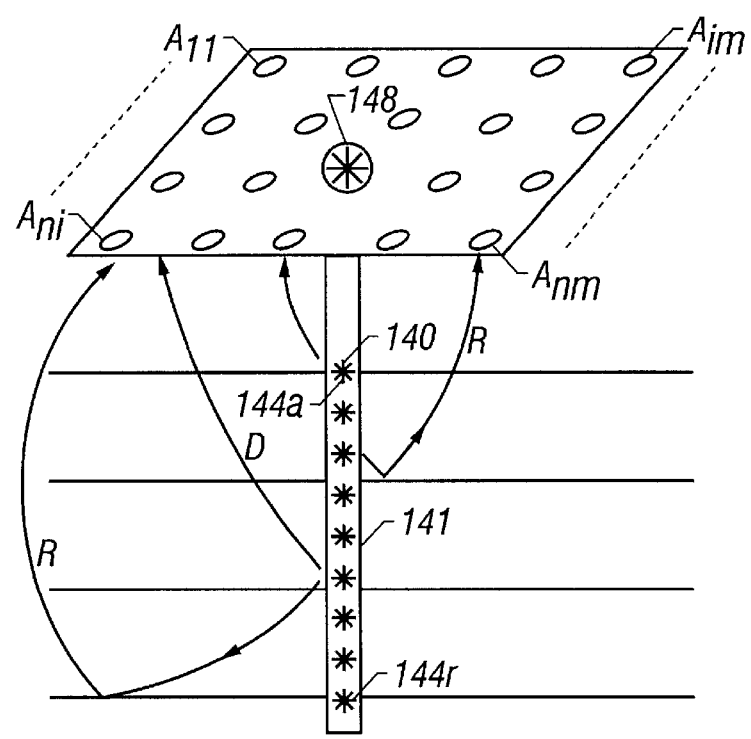
FIG. 5 shows a vertical view of the source-receiver layout corresponding to the layout of FIG. 4.

FIG. 5 shows a vertical view of the source-receiver layout corresponding to the layout shown in FIG. 4. In FIG. 5, the source 140 is activated at a plurality of depths 144a–144r in the well 141. The direct waves are denoted by "D" while the reflected waves are denoted by "R."

To perform the VSP survey corresponding to the geometry of FIG. 5, the locations of or the layout for the receivers and sources are reversed. The seismic wavelets are detected by receivers, placed at all of the locations previously occupied by the sources. The VSP and RVSP surveys are performed at an area of prior 3D-seismic survey or where seismic data will be acquired. The seismic survey may be on land or in a marine environment. An advantage of utilizing previously utilized 3-D survey positions is that common travel path traces can be created from the existing 3-D surveys. Also, during 3-D migration, the "finite difference" technique, which employs lowering of receivers from the surface in steps or intervals down to the maximum depth of interest can be utilized. This process can be stopped at various depths to produce only downgoing or downgoing plus upgoing waves. Since 3-D post stack data consists of reflections utilizing downgoing plus upgoing wave paths, the collected data may be a full suite of prestack data for amplitude versus offset or determination amplitude versus offset (AVO) and inverse use. This method is more expensive and utilizes a larger area compared to the above-described first survey method. The data may be collected to produce maps of the immediate vicinity of the well over time. Such data can be used to calibrate 4-D surveys.

Figure 6:
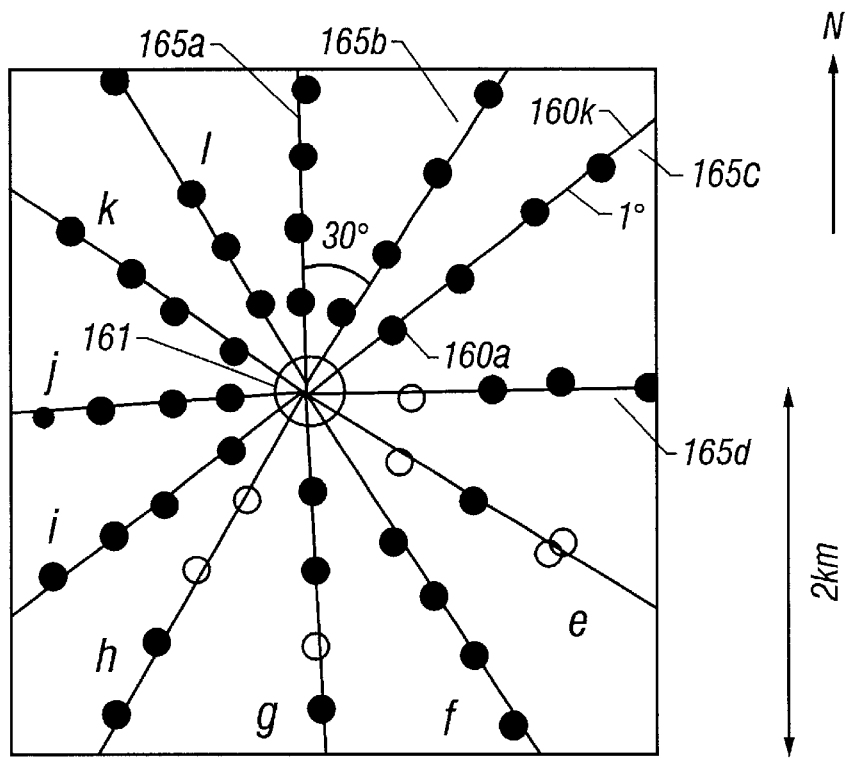
FIG. 6 shows an equal azimuth survey layout.

FIG. 6 shows an equal azimuth survey, wherein the RVSP data receivers are placed at spaced-apart locations 160a–160k radially extending from the wellbore 161. The radial lines 165a–165l are at equal angular distances. FIG. 6 shows a layout with equal increments of azimuth, the azimuth being the angle the raypaths travel with respect to the true north. Specifically, FIG. 6 shows a 30-degree angular separation of adjacent radial lines 165a–165l. Other radial separations may also be utilized. For the VSP survey data, the locations of the sources and seismic wavelet detectors are reversed.

Figure 7:
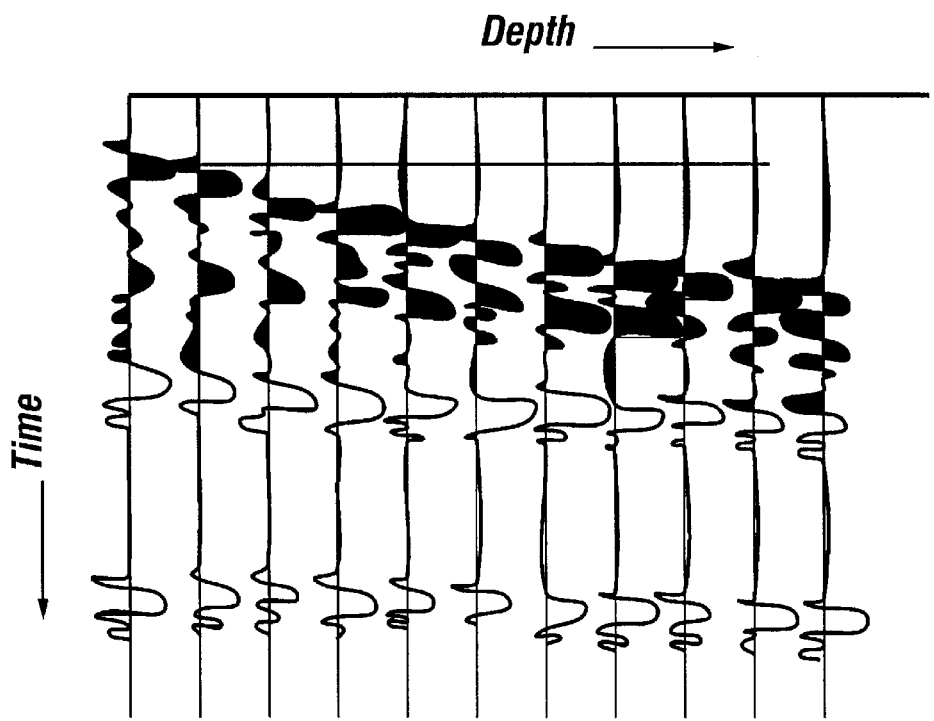
FIG. 7 shows representative gathers after partitioning the data into upgoing an downgoing waves.

FIG. 7 shows representative gathers after partitioning the data into upcoming and downgoing waves. Specifically, FIG. 7 shows partitioned (upgoing) waves at a particular azimuth (angle) as a function of offset. By comparing the upgoing waves with the downgoing waves as a function of the azimuth, time and space (offset), variant filters can be derived to scale prestack 3D data.

Figure 8:
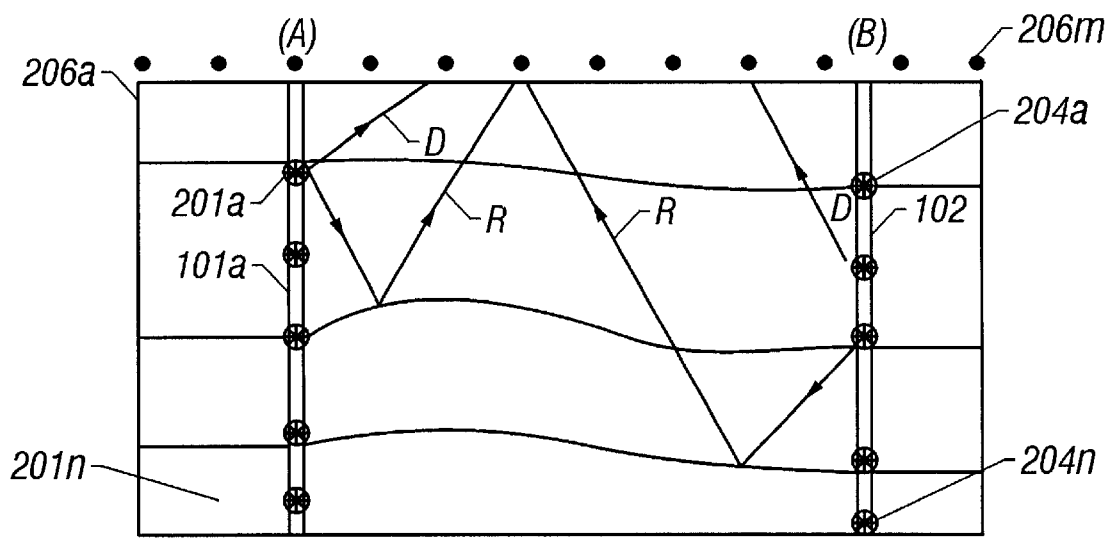
FIG. 8 shows a cross-well comparison of the upgoing and downgoing waves.

FIG. 8 shows a cross-well comparison of the upgoing and downgoing waves. In the particular layout of FIG. 8, sources are activated in the well 101 at locations 201a–201n in the well 201 and locations 202a–202n in well 202. Receivers are placed at spaced-apart locations 206a–206m at the surface. The direct waves are denoted by "D" while the reflected waves are denoted by "R." The positions of source (201a–201n and 202a–202n) and receivers (206a–206m) are then reversed to obtain VSP survey data. Data acquired by the survey geometry shown in FIG. 8 typically shows upgoing and downgoing response of the subsurface formations to the source. Utilizing a known cross-well tomography processing technique, data can be partitioned to separately show upgoing and downgoing response of the data. Velocity information can be derived from the earth's cross-section.

Figure 9:
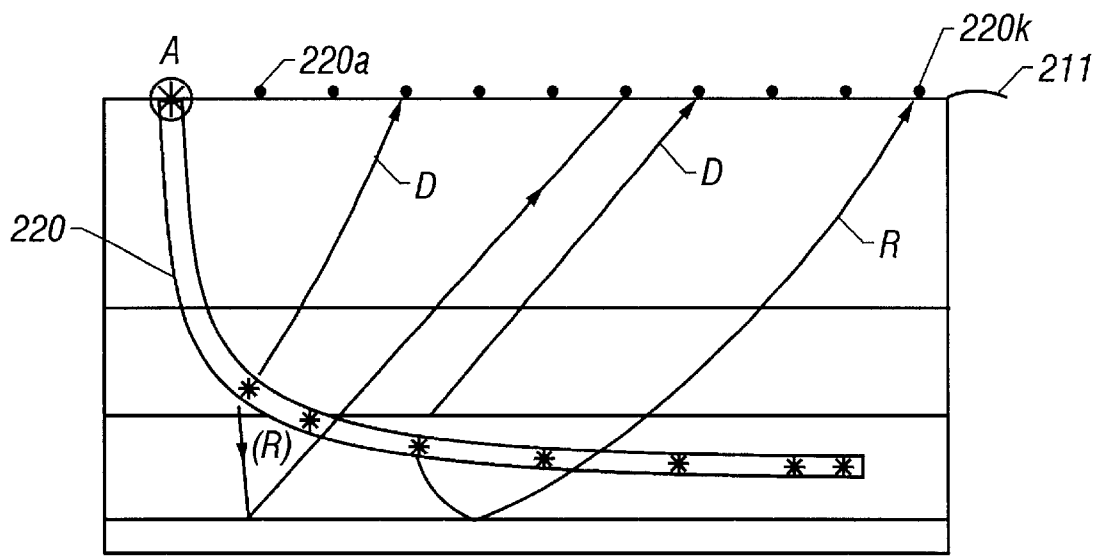
FIG. 9 shows a survey method wherein sources are activated in a deviated well with the seismic detectors at the surface.

FIG. 9 shows a survey method wherein sources are set off (activated) in a deviated well 220 while the seismic detectors are placed at spaced-apart locations 220a–220k at the surface 211 to obtain one (1) set of data. The positions of the sources and receivers are then reversed to obtain the second set of data. The upgoing and downgoing waves are compared to derive a velocity model to image complex geological objectives.

Thus, for the purpose of this invention, at least one (1) set of acoustic wave data is processed to obtain a transfer function, which is then applied to existing 3D data to obtain enhanced seismic maps of the earth's subsurface. The survey methods described herein are referred to as "Transfer Function" or "Tf" survey and the corresponding data collected is referred to as the Tf data. A number of methods may be utilized to process the transfer function survey data. Exemplary processing methods are described below.

For seismic data obtained for layouts shown in FIG. 1–FIG. 7, using data from survey of FIG. 3, estimates of spherical divergence, absorption are obtained. The preexisting 3D data may be reprocessed to create high resolution seismic data. Post stack wavelet shaping can increase resolution of the seismic data set. Wavelet estimates as a function of zones of interest can be made by comparing common raypath of the upgoing and downgoing waves.

Prestack data collection can provide estimates of amplitude versus offset (AVO) effects as a function of azimuth, which information may be utilized for 3D AVO prediction.

When Tf surveys are conducted over an oil/gas field repeatedly over a time period, then the variations of wavelets of upgoing and downgoing waveforms over that time period can be analyzed. This allows recalibration of the seismic data instead of acquiring new 3D seismic data over time. Equal azimuth survey data can be utilized to understand variations of amplitude and velocity as a function of azimuth. The Crosswell Tf surveys provide better velocity information compared to crosswell tomography, as it contains additional information from zone of interest to surface, and better definitions of velocity as a cross-section between wells.

With directionally-drilled wells and Tf surveys in complex geology, one can get a direct image of the earth's interior by combining upgoing and downgoing waves. Using azimuth configuration for data collection, one can analyze the conversion rates from "P" wave to "S" wave translations as a function of azimuth.

As noted above, this invention relates to a method of seismic surveying and processing seismic data by utilizing Tf surveys. In this method two (2) sets of recordings are made. The first set of recordings include placing seismic wave detectors in a wellbore at different depths to record acoustic waves emanating from a seismic sources located at or near the surface. This form of survey is typically called vertical seismic profile or (VSP) survey. A second set of recordings (a RVSP) is done by reversing the settings of the first recording, i.e., placing sources at positions previously occupied by seismic wave detectors and detectors at the location of the previously placed sources.

The first set of recordings include downgoing components representing direct arrivals, other multiple reflections, and upgoing reflections from below the seismic wave detector depth. The second set of recordings include upgoing components representing direct arrivals, other multiple reflections, and downgoing reflections from below the source depth.

The first seismic process step to be applied to the data is to perform wavefield separation. During wavefield separation the upgoing and downgoing wavefields are split into two different data sets. Techniques similar to the method described in U.S. Pat. No. 4,794,573 can be employed to perform wavefield separation. Other suitable techniques may also be utilized.

Comparison sets include comparing downgoing wavefield of the first recordings with the upgoing wavefield of the second recordings. This process relies on the fact that these traces are gathered into duplicate wavepath traces with the same or substantially the same upgoing and downgoing wavepaths. The main difference being that the source wavelet w(t) decays in opposite manners and the upgoing wavefield response is reversed. This allows one to create matched output filters.

Signal $b_0$, $b_1$,—downgoing

Filter $a_0$, $a_1$

Output $C_0C_1$, C,—upgoing or $a_0b_0a_0b_1+a_1b_0$, $a_1b_1$,—result of convolution It is desired that the output be similar to the upgoing waveforms. Coefficients $a_0$ and $a_1$ can be directly derived in the frequency domain. Suppose time signal s(t) is known then S(f) can be expressed as:

$$S(f)=|P(f)|^{1/2}e^{i\theta(f)}$$

where S(f) is the frequency domain representation of s(t), P(f) is the power spectrum, and $\Theta$ (theta) is the phase at each frequency "f.".

Then over gated comparisons of the upgoing ("U(t)") and downgoing ("D(t)") identical travel paths yield:

$$D(f)=|P_1(f)|^{1/2}e^{-i\theta(f)} \qquad \text{eqn. (i)}$$

$$U(f)=|P_2(f)|^{1/2}e^{-i\theta(f)} \qquad \text{eqn. (ii)}$$

where $P_1(f)$ is a power spectrum of D(t) and $P_2(f)$ is a power spectrum of U(t).

Figure 10A:
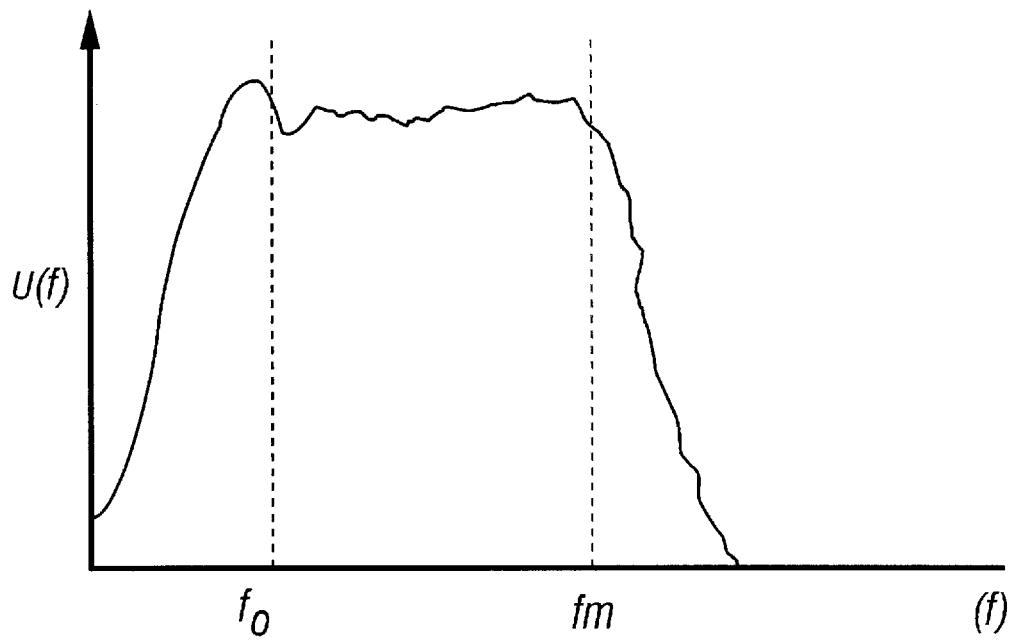
FIGS. 10A–10B show examples of power spectra for the upgoing and downgoing waves.
Figure 10B:
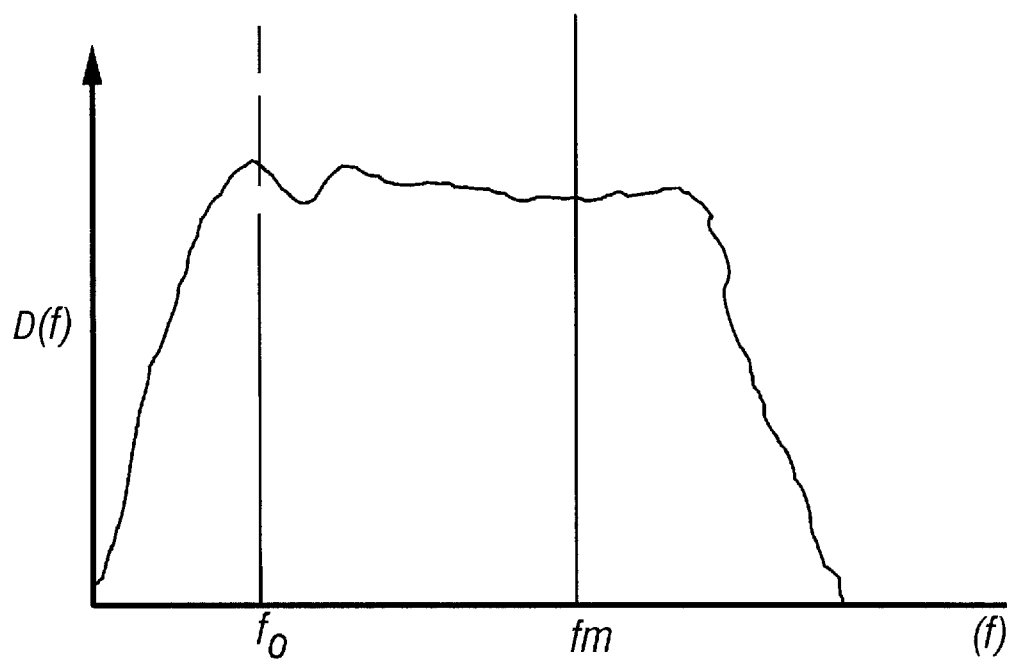

Examples of the U(f) and D(f) spectra are shown respectively in FIGS. 10A and 10B. The decay of higher frequencies (f) in those terms are usually different. The phase ($\Theta$) at these frequencies is also different.

Consider a damped sinusoid wave propagating along the Z axis where amplitude $A(z)=e^{i2\Pi f(t-z/c)}$, where f=frequency; t=time; z=depth; and c=velocity If Q is the loss suffered by the rock for each cycle then if Q=loss/cycle, and if $\lambda$ is the wavelength. Then $$\alpha = \frac{Q}{L}$$

$$\alpha = \frac{loss/cycle}{length\ cycle} = \frac{loss}{length}$$

or $$\alpha = \underline{Qf/C} \qquad \text{eqn. (iii)}$$

So $\alpha$ is proportional to the first power of frequency. Therefore:

$$e^{-z}=e^{Qf/c \cdot ct}=e^{Qt} \qquad \text{eqn. (iv)}$$

The amplitude decay can be expressed as:

$$A(z)=e^z \qquad \text{eqn. (v)}$$

Substituting from (iv) yields:

$$A(f,\ t)=e^{Qft} \qquad \text{eqn. (vi)}$$

Figure 11:
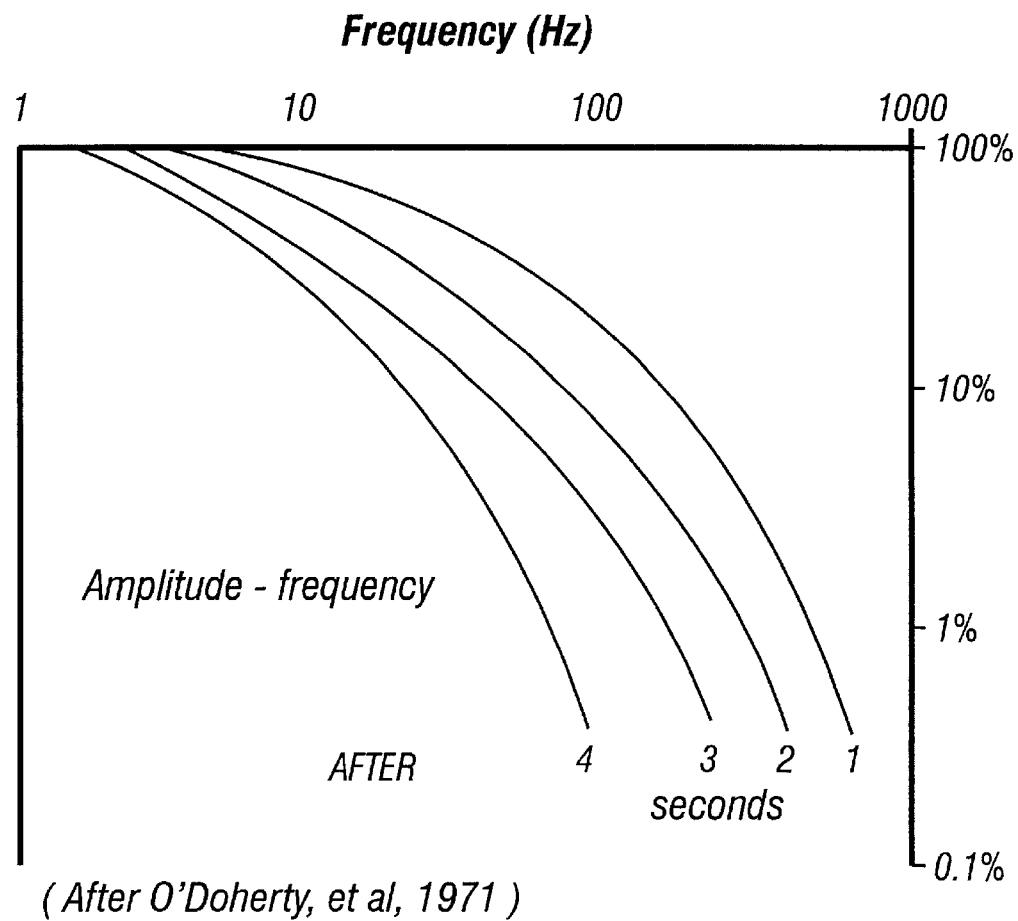
FIG. 11 is an example of amplitude decay at frequencies at different times.

Equation (vi) is used into Equations (i) and (ii), i.e., the power spectrum comparisons of identical travel paths. "Q" is observed to be a constant for most geological materials in the range of seismic frequencies. We now compare U(f) and D(f) at each frequency f. FIG. 11 is an example of amplitude decay at frequencies at different times.

Since there are two paths—from surface to seismic wave detector in the well and reverse—where the loss suffered is opposite in time, the rate of loss of each frequency with time similar to what is shown in FIG. 11 can be plotted.

Each frequency is then scaled to the level indicated by U(f) and store the scaler applied at each frequency. When U(f)=D(f), all loss of amplitude as a function of frequency is taken out. Let the filter that makes U(f)=D(f) be H(f). H(f) can then be applied to the existing seismic 3D data, and post-stack data before migration.

Then H(f)=U(f)/D(f)

or H(f)=U(f)/D(f)+N(f)

where N(f) is "white noise" added to prevent filter blow up. The filter H(f) implicitly describes the parameter "Q." The keys to the comparison of data sets are: (a) compare upgoing versus downgoing same or substantially the same travel paths organized in increasing time; (b) use the stacking process to remove effects of noise; (c) scale dataset downgoing waves to match upcoming waves, (d) store scalers, and (e) apply them to 3D seismic data in a horizon consistent fashion.

Examples of (five point) gates are: First compute the envelope function of each set. Let $U_t$ be the upgoing trace envelope function in time and let Dt be the downgoing trace envelope function in time. Then:

$U_t = a_1, a_2, a_3, a_4 \ldots$ (coefficients of each sample) and $D_t = b_1, b_2, b_3, b_4 \ldots$ (coefficients of each sample)

then the scale envelope trace $S_t$ is in its simple terms described as:

$S_t = a_1/b_1, a_2/b_2, a_3/b_3, a_4/b_4 \ldots$

This scale envelope trace S(t) is applied to the existing 3D seismic data in a horizon consistent manner. The above process compensates amplitude losses suffered by the seismic waves on post-stack 3D data set. The post-stack 3D seismic data set is a representation of zero offset—P wave stack.

A more rigorous processing method for use in the present invention is described below. The design of a single trace can be extended in the prestack domain. Without any processing to the existing 3D seismic data the original acquired data for the present invention is merged with the geometry of the 3D survey. The data are then sorted into common-offset volumes. Filters derived from the $T_f$ survey are applied along horizons on common-offset volumes, as a first step to data conditioning to accurately compensate for amplitude loss in time and (source) wavelet decay.

Figure 12:
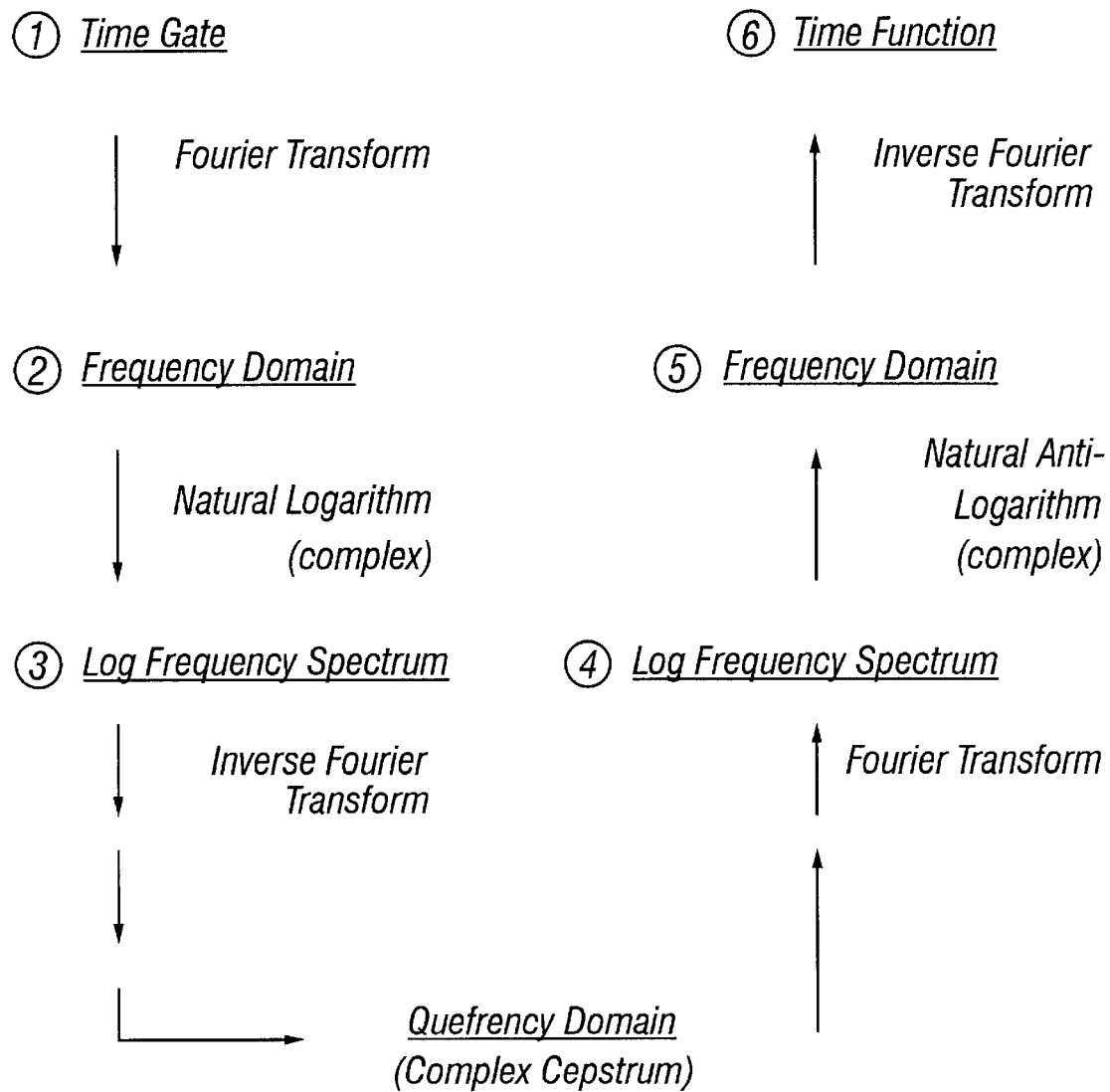
FIG. 12 is a flow chart of steps taken in a comparison process according to one method of the present invention.

$T_f$ survey data are first collected to represent the range of offsets described by d, d+▲d, d+2▲d ... etc., where 'd' is an offset and '▲d' is an increment of offset, and up to the farthest offset of the original 3D data set encompassing the well. $T_f$ data is processed through wavefield separation and arranged (gathered) into upgoing and downgoing waveforms having substantially identical wavepaths, of same offsets d, d+▲d, d+2▲d ... etc. Data summations are performed along common upgoing and common downgoing sets of d, d+▲d, d+2▲d etc. Comparisons of common time gates are made in this process in the "quefrency domain". Flow diagram of FIG. 12 shows the route taken in the comparison process. The main steps are:

Step 1 For each gate for each d, d+▲d, d+2▲d ... for upgoing and downgoing traces derive the frequency domain representations of the gate by a Fourier transform.

Step 2 Take the natural logarithm (base e) of the frequency domain. This is a complex quantity, since the frequency domain is complex.

Step 3 Take the inverse Fourier transform of the log frequency spectrum. This is called a "complex cepstrum" of the data in the "quefrency domain."

Filters are derived in this domain and can be transformed to time using steps 4 through 6 indicated on the flow chart of FIG. 12.

The "quefrency" domain is a kind of time domain in which the data are displayed as amplitude versus time values. The two basic characteristics of this domain that make it useful for seismic data processing for the method of the present invention are:

(a) If the data within each gate is assumed to be the convolution of the source wavelet w(t) convolved with earth reflectivities r(t), then in time domain:

$S(t) = r(t) \circledast w(t)$ (a convolution process)

where S(t) is the resulting seismic trace.

In the frequency domain this becomes:

$S(f) = R(f) \times W(f)$ (a multiplicative process)

where S(f), R(f) and W(f) are the Fourier Transforms of S(t), r(t), w(t), respectively. Hence convolution in the time domain is multiplication in the frequency domain.

(b) When the natural logarithm of the frequency domain is taken, then this equation becomes:

Log $S(f)$ = Log $R(f)$ + Log $W(f)$

The operation is now an addition. When this is transformed into the quefrency domain, it becomes:

$S(q) = r(q) + W(q)$ where S(q), r(q) and W(q) are the complex cepstra of S(t), r(t) and w(t).

This transforms convolution in the time domain in addition to the quefrency domain.

Figure 13:
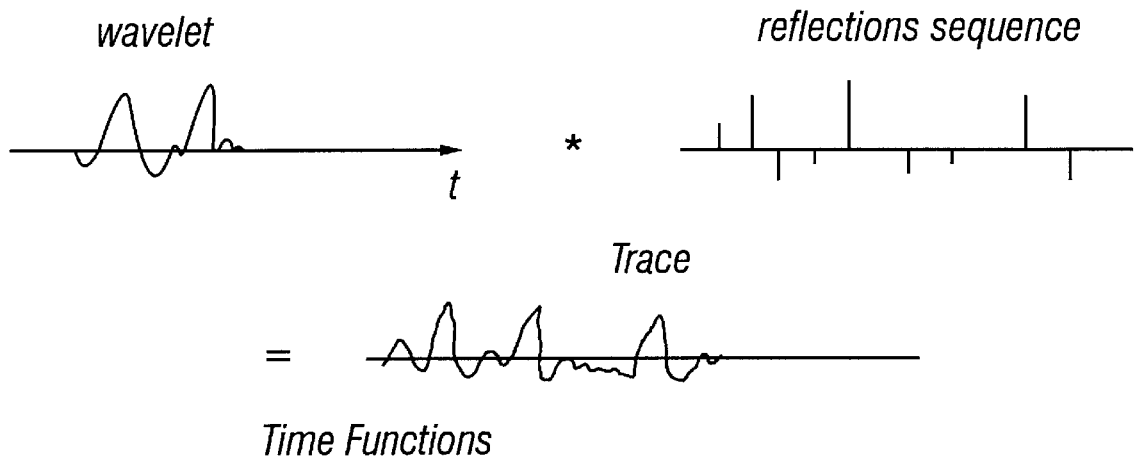
FIGS. 13 and 14 show that wavelet in the cepstra domain is separated from response of reflect on series.
Figure 14:
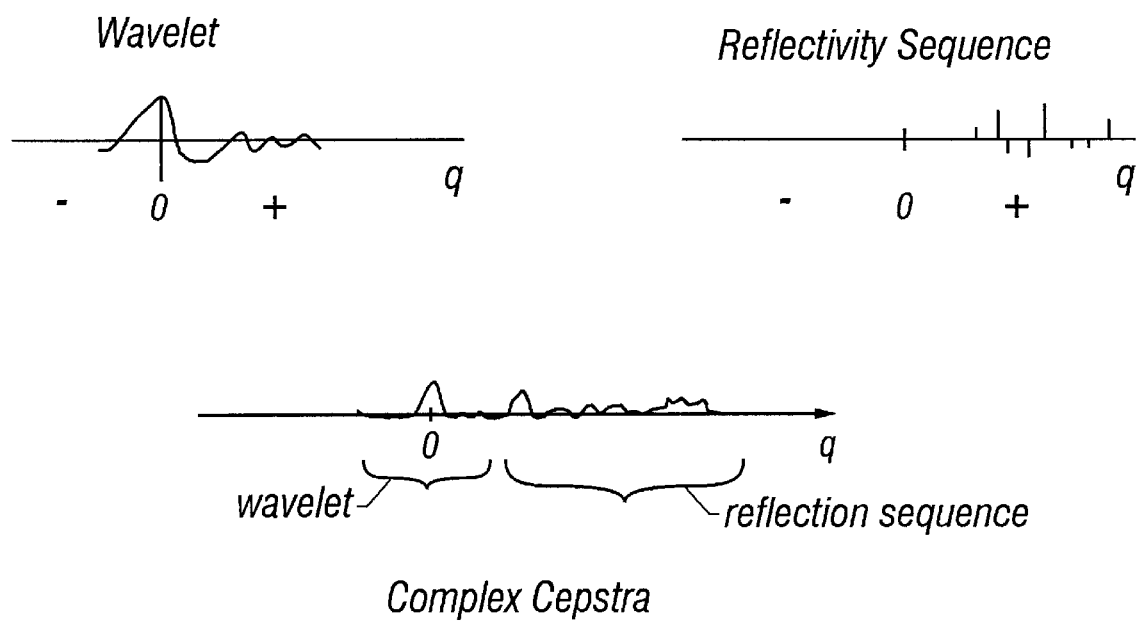

The illustrations shown in FIGS. 13 and 14 show that the wavelet in the cepstra domain is separated from the response of reflection series. A minimum phase wavelet will have all its energy at positive frequencies, mixed phase on both positive and negative quadrants, and maximum phase in the negative quadrant. Thus, some judgment of the wavelet position is needed to extract the wavelet.

The present method first flips the polarity of upcoming waves as R=−R when comparing downgoing with upgoing waves. Then, their frequency response is compared over a gate. Since the reflectivity sequence is common for identical upgoing and downgoing rays for each set of offset d, d+▲d, d+2▲d ... etc., but the transmission loss, absorption loss and spherical divergence are different, and since processes are additive in the quefrency domain, we zero out the reflection sequence and take the difference between $w_1(t)$'s, the net wavelet difference.

If $D(t) = r(t) \circledast w_1(t)$, where D(t) is the downgoing wave response over a gate of length 'T', r(t) is reflectivity sequence, and $w_1(t)$ is downgoing wavelet within the gate, then, $U(t) = r(t) \circledast w_2(t)$ as U(t) is the upgoing wave, r(t) is the reverse signed reflectivity series. We flip polarity of U(t) to get wavelets lined-up correctly. The quefrency response is:

$D(q) = r(q) + W_1(q)$ $U(q) = r(q) + W_2(q)$

D(q)−U(q) gives us the net waveform difference in the gate. Using steps 4 through 6 we convert the difference D(q)−U(q) which is $[W_1(q) - W_2(q)]$, the residual wavelet difference.

Step 4 Take the Fourier Transform of the complex cepstrum $[W_1(1) - W_2(q)]$ to return to the log frequency domain.

Step 5 Take the natural antilogarithm of the log frequency domain to give normal frequency domain.

Step 6 Inverse Fourier Transform the frequency to the time domain.

This gives us the time domain representation of the derived filter.

A filter is derived for every offset, time gate, and applied to pre-stack 3D data in an horizon dependent manner and the data processed using conventional 3D processing. The resultant 3D data has enhanced frequencies and therefore able to resolve objects better.

Figure 15:
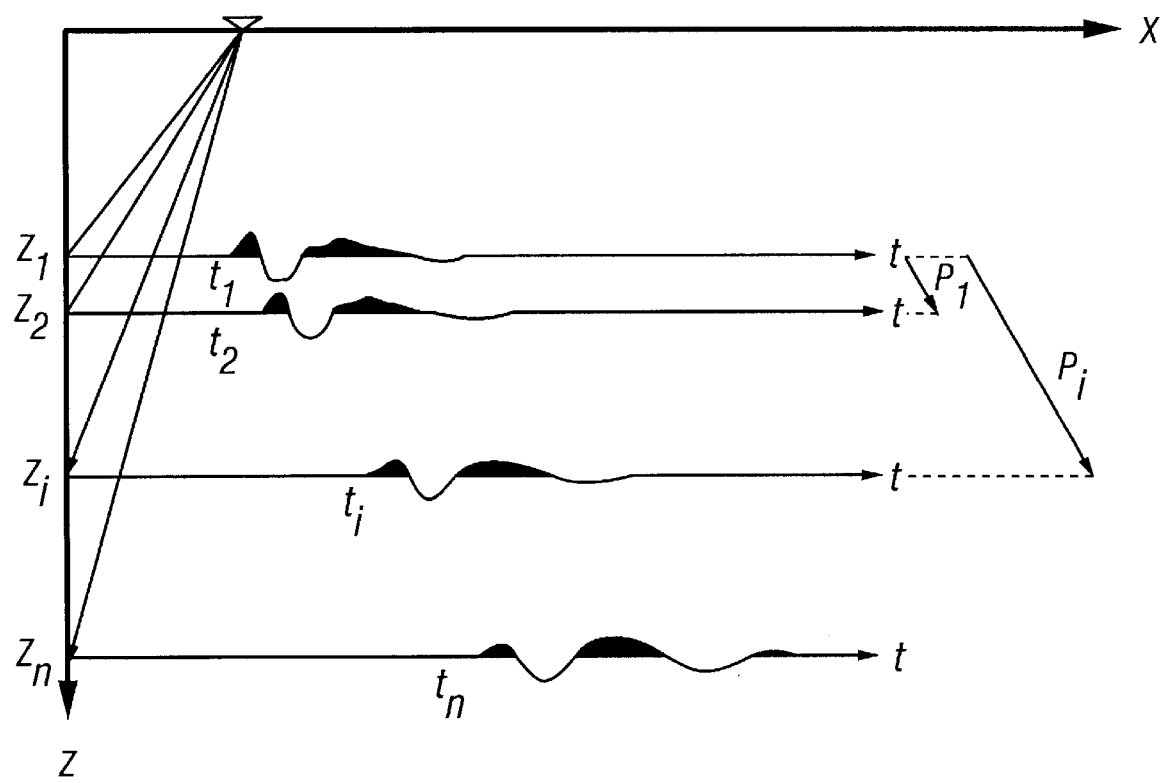
FIG. 15 shows example data-collected in a wellbore at various depths.

For one preferred embodiment of the present invention, a VSP filter may be created and applied to surface seismic data. Consider zero offset VSP data gathered in the geophones in the well at the depths $z_1, Z_2, z_3, \ldots, zn$, see FIG. 15. Then from the recorded wavefield we can separate downgoing and upgoing wavefield. Let $u_i(t)$ be downgoing wavefield trace in the i-th receiver. After wavefield separation, we can consider $u_i(t)$ as an incident wavelet. Following this wavelet change from the first to the last receiver, we can observe its change according to high frequency loss.

We can describe these losses with a set of operators. We can find an operator $p_i$ that describes the medium influence on the wavelet while propagation from the point $z_1$ to the $z_i$ (FIG. 1):

$$u_i(t) = p_i(t) * u_1(t) \quad (1)$$

Then inverse operator $l_i = p_i^{-1}$ that restores high frequency losses can be found from the equation:

$$u_1(t) = l_i(t) * u_i(t) \quad (2)$$

This equation can be solved in the frequency or in time domain. In the frequency domain, after the Fourier transformation we obtain:

$$U_1(\omega) = L_i(\omega) U_i(\omega) \quad (3)$$

where $U(\omega)$ is Fourier transformation (complex spectrum) of $u(t)$. From (3) it follows that $$L_i(\omega) = U_1(\omega)/U_i(\omega) = U_1(\omega)) U_i^*(\omega)/|U_i(\omega)|^2 \quad (4a)$$

We have noise in real data and instead of (4a) we may write $$L_i(\omega) = U_1(\omega)/U_i(\omega) = U_1(\omega) U_i^*(\omega)[|U^i(\omega)|^2 + \alpha^2] \quad (4b)$$

where a is a noise level.

In the time domain, we can solve the equation (2) by the least squares method which leads to Wiener equation:

$$Al = b \quad (5)$$

where A is a matrix made from an autocorrelation function for $u_i(t)$, $I = (I(t_1), I(t_2), \ldots I(T_n))$, and $b = (b_1, b_2, \ldots, b_n)$ is cross correlation function for $u_1(t)$ and $u_i(t)$.

Thus for every depth $z_2, Z_3, \ldots, Z_n$ we build the filter that recovers wavelet losses while wave propagation from the depth $z_1$ to the depth $z_i$. The medium influence on the upgoing wave can be considered the same as for downgoing wave. It follows that we can find the medium influence on the wave as a convolution of the operator 1 with itself:

$$m_i(t) = l_i(t) * l_i(t) \quad i = 1, 2, 3, \ldots, n \quad (6)$$

Thus for every receiver depth $z_i$ we have the operator $M_i = m_i(t)$ that restores frequency losses while propagation from the level $z_1$ to the level $z_i$ and the time $\tau_i$ corresponding to this operator.

For every depth $z_i$ we know first time break $t_i$ from VSP data. Then the time $\tau_i = 2t_i$ gives us the time of the wave reflected from the boundary at the depth $z_i$. It means that if we apply this operator $M_i$ to the surface post stack seismic trace (when the source coincides with the receiver) from the time $\tau_i$ we obtain the wavelet restored from the frequency losses.

Now we will apply these filters to restore frequency losses for seismic section trace. Let us consider seismic post stack trace $u(t)$. We know the set of the operator $M_i$ and the corresponding times $\tau^i$. Then we interpolate these operators for every sample of the trace $u(t)$ along the time t: for every sample $t_j = j \times \Delta t$, $(j = 1, 2, \ldots, k)$ greater than or equal to $\tau_1$ and less than or equal to $\tau_n$ ($\Delta t$ is a time sample interval) we can obtain an operator $N_j(t)$ by linear interpolation of two operators corresponding to the times $\tau_n$ and $\tau_{n+1}$ such that $t_j \in [\tau_i, \tau_{i+1}]$. It follows that for every sample $t_j$ where $(\tau_1 \leq t_i \leq \tau_n)$ we have an operator $N_j(s)$ that restores frequency losses. Then we apply this operator to obtain the value $v(t_j)$ of the output seismic trace:

$$v(t_j) = \sum_{k=1}^{K} N_j(s_k) u(t_j - s_k) \quad (7a)$$

From this formula, one can see that for every sample $t_j$ we use its own operator $N_j(s)$. The number of calculations is the same as if we use usual convolution with one operator $N(s)$:

$$v(t_j) = \sum_{k=1}^{K} N(s_k) u(t_j - s_k) \quad (7b)$$

While the exposition of equations 1 through 7b have been explained in terms of upgoing waves, it will be apparent that the exposition is equally applicable to the downgoing wavefield.

The foregoing description is directed to particular embodiments of the present invention for the purpose of illustration and explanation. It will be apparent, however, to one skilled in the art that many modifications and changes to the embodiment set forth above are possible without departing from the scope and the spirit of the invention. It is intended that the following claims be interpreted to embrace all such modifications and changes.

What is claimed is:

1. A method of processing seismic data comprising:
   (a) acquiring a first set of seismic data representative of an upgoing wavefield;
   (b) acquiring a second set of data representing a downgoing wavefield wherein source and receiver locations of said first set of data are reversed; and
   (c) combining the first and second sets of data to obtain a transfer function.

2. The method of claim 1 wherein said transfer function is obtained by combining said first and second data sets along substantially the same wavepaths, the method further comprising:
   (a) determine substantially equivalent wavepath gates for upgoing and downgoing wavefields from acquired data,
   (b) determining for upgoing and downgoing wavefield traces in said wavepath gates, the frequency domain representations of the substantially equivalent wavepath gate by a Fourier transform to derive Fourier transformed gate data, (c) determine the natural logarithm of said Fourier transformed gate data to derive natural log data for upgoing and downgoing gates, (d) determine the inverse Fourier transform of the natural log data to derive complex cepstrum data for upgoing and downgoing derived natural log data, (e) derive a net waveform difference between the substantially equivalent upgoing and downgoing wavepath gate complex ceptstrum data, (f) determine the Fourier transform of the net waveform difference to derive a Fourier transformed net waveform difference, (g) determine the natural antilogarithm of the Fourier transformed net waveform difference to derive a normal frequency domain waveform, (h) determine the inverse Fourier transform of the normal frequency domain waveform to derive a time domain representation of a filter derived for the substantially equivalent wavepath gate.

3. The method of claim 2 wherein said derived filter is applied to a third set of seismic data in a horizon dependent manner.

4. The method of claim 2 wherein said derived filter is applied to a third set of prestack seismic data in a horizon dependent manner according to the offsets of the acquired data and seismic data.

5. The method of claim 1 wherein said first set of data and said second set of data are chosen from (i) a VSP survey, (ii) a RVSP survey, (iii) surface seismic data, (iv) marine seismic data, and (v) land seismic data.

6. The method of claim 2 wherein deriving said filter further comprises interpolating said transfer function values between wavepath gates spatially and temporally.

7. The method according to claim 1, further comprising applying the transfer function to three dimensional (3D) seismic data chosen from (i) prestack data, and (ii) poststack data.

8. A method of acquiring and processing seismic data comprising:

(a) acquiring a first set of data by activating an acoustic source in at least one location in a wellbore and recording data with a receiver at at least one location at or near a surface location;

(b) acquiring a second set of data by reversing the locations of the receiver and source; and (c) combining the first and second sets of data to obtain a transfer function.

9. The method of claim 8 wherein said transfer function is obtained by combining said first and second data sets along substantially the same wavepaths, the method further comprising:

(a) determine substantially equivalent wavepath gates for upgoing and downgoing wavefields from acquired data, (b) determining for upgoing and downgoing wavefield traces in said wavepath gates, the frequency domain representations of the substantially equivalent wavepath gate by a Fourier transform to derive Fourier transformed gate data, (c) determine the natural logarithm of said Fourier transformed gate data to derive natural log data for upgoing and downgoing gates, (d) determine the inverse Fourier transform of the natural log data to derive complex cepstrum data for upgoing and downgoing derived natural log data, (e) derive a net waveform difference between the substantially equivalent upgoing and downgoing wavepath gate complex ceptstrum data, (f) determine the Fourier transform of the net waveform difference to derive a Fourier transformed net waveform difference, (g) determine the natural antilogarithm of the Fourier transformed net waveform difference to derive a normal frequency domain waveform, (h) determine the inverse Fourier transform of the normal frequency domain waveform to derive a time domain representation of a filter derived for the substantially equivalent wavepath gate.

10. The method of claim 9 wherein said derived filter is applied to a third set of seismic data in a horizon dependent manner.

11. The method of claim 9 wherein said derived filter is applied to a third set of prestack seismic data in a horizon dependent manner according to the offsets of the acquired data and seismic data.

12. The method of claim 8 wherein deriving said obtained transfer function further comprises interpolating said transfer function values spatially and temporally.

13. The method of claim 8 wherein said obtained transfer function is applied to a third set of seismic data.

14. The method of claim 8 wherein said transfer function is applied to 3D seismic data.

15. The method of claim 8 wherein said first set of data and said second set of data are chosen from (i) a VSP survey, (ii) a RVSP survey, (iii) surface seismic data, (iv) marine seismic data, and (v) land seismic data.

16. The method of claim 8 wherein said first set of data and said second set of data are chosen from (i) a set of upgoing waves representing the upgoing wavefield, and, (ii) a set of downgoing waves representing the downgoing wavefield.

17. A method of acquiring and processing seismic data comprising:

(a) acquiring a first set of data by activating an acoustic source for at least one location in a wellbore and recording data with a receiver at at least one location at or near a surface location;

(b) acquiring a second set of data by reversing the locations of the receiver and source;

(c) combining the first and second sets of data to obtain a transfer function; and (d) applying said transfer function to a third set of seismic data to obtain an enhanced seismic map of the earth's subsurface.

18. The method according to claim 17, wherein the third set of seismic data comprises a three dimensional (3D) seismic data chosen from (i) prestack data, and (ii) poststack data.

19. The method according to claim 17, further comprising applying the obtained transfer function to seismic data in a horizon dependent manner.

\* \* \* \* \*